(12) United States Patent
Khatami et al.

(10) Patent No.: US 10,510,367 B1
(45) Date of Patent: Dec. 17, 2019

(54) METHOD AND APPARATUS FOR PROCESSING MULTIPLE SERVO CHANNELS IN MAGNETIC RECORDING DEVICES

(71) Applicant: Marvell International Ltd., Hamilton (BM)

(72) Inventors: Seyed Mehrdad Khatami, Foster City, CA (US); Mats Oberg, San Jose, CA (US); Michael Madden, Mountain View, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 16/150,356

(22) Filed: Oct. 3, 2018

Related U.S. Application Data

(60) Provisional application No. 62/620,946, filed on Jan. 23, 2018.

(51) Int. Cl.
  *G11B 5/55*  (2006.01)
  *G11B 5/596*  (2006.01)
  *G11B 5/60*  (2006.01)

(52) U.S. Cl.
  CPC ........ *G11B 5/5543* (2013.01); *G11B 5/59605* (2013.01); *G11B 5/59688* (2013.01); *G11B 5/6076* (2013.01); *G11B 5/5547* (2013.01)

(58) Field of Classification Search
  None
  See application file for complete search history.

(56) References Cited

U.S. PATENT DOCUMENTS

| | | | | |
|---|---|---|---|---|
| 6,278,568 | B1* | 8/2001 | Cloke | G11B 20/10009 360/46 |
| 6,282,045 | B1* | 8/2001 | Glover | G06F 3/0626 360/73.03 |
| 7,522,365 | B1* | 4/2009 | Chen | G11B 5/012 360/31 |
| 2006/0126204 | A1* | 6/2006 | Taniguchi | G11B 20/10009 360/31 |
| 2015/0029608 | A1* | 1/2015 | Mathew | G11B 20/10268 360/30 |
| 2015/0062730 | A1* | 3/2015 | Mathew | G11B 20/10018 360/29 |
| 2015/0116860 | A1* | 4/2015 | Coker | G11B 20/10046 360/65 |
| 2015/0199991 | A1* | 7/2015 | Mathew | G11B 20/10055 360/65 |

* cited by examiner

*Primary Examiner* — Tan X Dinh

(57) ABSTRACT

A method of operating a storage device includes reading data from a storage medium using a detector, processing signals from the detector through a plurality of processing circuits, each respective processing circuit in the plurality of processing circuits being optimized for a different state of a channel condition and providing a respective output metric, selecting a processing circuit from the plurality of processing circuits by comparing the respective output metrics from each processing circuit in a predetermined manner, and designating as output of the detector output of the processing circuit that is selected. The output metrics may be branch metrics or path metrics, and the channel condition may be fly-height or phase shift. The storage device includes a storage medium, and a read channel including a detector, and processing circuits that process signals from the detector. Each respective processing circuit is optimized for a different state of a channel condition.

28 Claims, 11 Drawing Sheets

METHOD AND APPARATUS FOR PROCESSING MULTIPLE SERVO CHANNELS IN MAGNETIC RECORDING DEVICES

CROSS REFERENCE TO RELATED APPLICATION

This claims the benefit of commonly-assigned U.S. Provisional Patent Application No. 62/620,946, filed Jan. 23, 2018, which is hereby incorporated by reference herein in its entirety.

FIELD OF USE

This disclosure relates to data storage systems of the type in which read and write heads move over the surface of a storage medium. More particularly, this disclosure relates to processing servo data from multiple read heads.

BACKGROUND

In magnetic recording, as one example, reading and writing are performed by one or more heads that move relative to the surface of a storage medium. Many magnetic disk drives, for example, include a plurality of individual disks, or "platters," which may be two-sided—i.e., each platter can store data on each of its two sides. Therefore, such a disk drive would have at least two heads for each platter. Indeed, for each platter, there is normally at least one write head and at least one separate read head, so that such a disk drive normally has at least four heads per platter.

In a common configuration, all of the heads in a given disk drive are mounted on arms attached to a common actuator that controls the radial position of the heads (an angular, tangential or circumferential component of motion is provided by the rotation of the platters relative to the heads). This is true whether there is one or many platters, and one or multiple heads per platter.

In order to control the radial position selected by the actuator, each surface of each platter has distributed upon it positional information referred to as "servo" data. The servo data are commonly distributed in spaced-apart servo "wedges" (generally spaced equiangularly) on the platter surface. By reading the servo data as each servo wedge passes under the read head, the disk drive controller can determine the precise radial and angular position of the head and can feed back that determination to control the position of the read head or the write head, depending on the required operation. Among the servo data are sync marks, which are used to determine angular position. Within each wedge, separate instances of the sync mark may be provided at different radial positions—i.e., for different tracks.

Although, as noted above, there may be multiple read heads for each drive, or even for each platter, each of those read heads may experience different, and potentially changing, channel conditions. Heretofore it has not been possible to adapt processing of servo signals to account for more than one set of channel conditions.

SUMMARY

A method of operating a storage device in accordance with implementations of the subject matter of the present disclosure includes reading data from a storage medium using a detector, processing signals from the detector through a plurality of processing circuits, each respective processing circuit in the plurality of processing circuits being optimized for a different state of a channel condition and providing a respective output metric, selecting a processing circuit from the plurality of processing circuits by comparing the respective output metrics from each processing circuit in a predetermined manner, and designating as output of the detector output of the processing circuit that is selected. In such a method, the respective output metrics may be branch metrics or path metrics, and the channel condition may be fly-height or phase shift.

In one implementation of such a method, the selecting by comparing may include converting the respective output metrics from each detector into respective probabilities, and selecting the detector corresponding to a greatest probability of the respective probabilities. Such an implementation may further include summing the respective output metrics from each detector prior to the converting.

In another implementation of such a method, the reading may include reading data from a storage medium using at least two detectors, and the method may further include performing the processing, the selecting and the designating separately for each detector in the at least two detectors. In such an implementation, the performing may occur seriatim for each detector in the at least two detectors, or the performing may occur in parallel for each detector in the at least two detectors.

Still another implementation of such a method may further include maintaining statistics of results of the designating, and deriving the state of the channel condition from the statistics. Such an implementation may further include determining in advance a relationship between the results of the selecting and the state of the channel condition.

A storage device in accordance with implementations of the subject matter of the present disclosure includes a storage medium, and a read channel including at least one detector, a plurality of processing circuits that process signals from the at least one detector, each respective processing circuit in the plurality of processing circuits being optimized for a different state of a channel condition and providing a respective output metric, and a read channel controller that selects a processing circuit from the plurality of processing circuits by comparing the respective output metrics from each processing circuit in a predetermined manner. Each respective processing circuit may provide, as the respective output metric, a branch metric or a path metric. Each respective processing circuit in the plurality of processing circuits may be optimized for a respective fly-height or for a respective phase shift.

In one implementation of such a storage device, the read channel controller may be configured to convert the respective output metrics from each respective processing circuit into respective probabilities, and select the processing circuit corresponding to a greatest probability of the respective probabilities.

In that implementation, the read channel controller may further be configured to sum the respective output metrics from each respective processing circuit prior to converting the respective output metrics from each respective processing circuit into respective probabilities.

In another implementation of such a storage device, the read channel controller may further be configured to maintain statistics of results of selecting the processing circuit, and derive the state of the channel condition from the statistics. In such an implementation, the read channel controller may store a relationship between the results of selecting the processing circuit and the state of the channel condition.

In yet another implementation of such a storage device, the at least one detector may include at least two respective detectors.

In a variant of such an implementation, the read channel controller may separately, for each respective one of the at least two respective detectors, select a respective processing circuit from the plurality of processing circuits, by comparing the respective output metrics from each processing circuit in a predetermined manner.

In one such variant, the read channel controller may select a respective processing circuit seriatim for each respective one of the at least two respective detectors. In another such variant, the read channel controller may select a respective processing circuit in parallel for each respective one of the at least two respective detectors.

In another variant of such an implementation, the respective detectors in the plurality of detectors may have identical impulse responses.

In yet another variant of such an implementation, each respective detector in the plurality of detectors may have a respective impulse response. In such other variant, each respective detector in the plurality of detectors may be optimized for the respective different state of the channel condition.

BRIEF DESCRIPTION OF THE DRAWINGS

Further features of the disclosure, its nature and various advantages, will be apparent upon consideration of the following detailed description, taken in conjunction with the accompanying drawings, in which like reference characters refer to like parts throughout, and in which.

DETAILED DESCRIPTION

Figure 1:
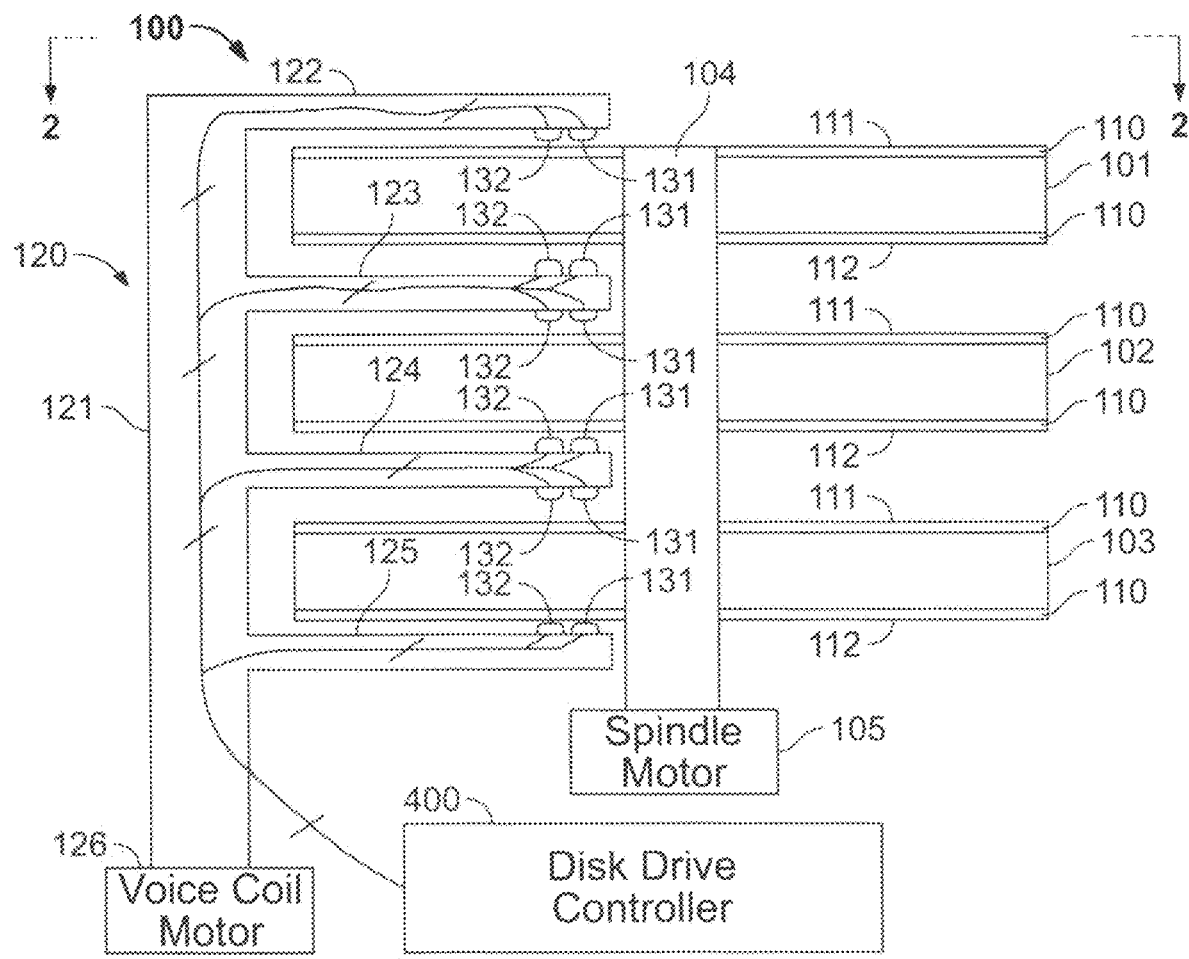
FIG. 1 is a side elevational view of a portion of a disk drive with which the present disclosure may be used.
Figure 2:
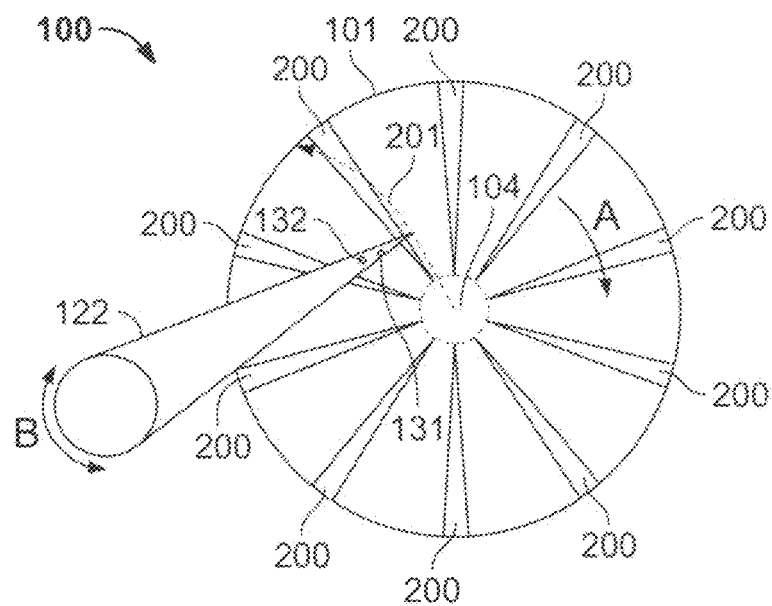
FIG. 2 is a plan view of the disk drive portion of FIG. 1, taken from line 2-2 of FIG. 1.

FIGS. 1 and 2 show an example of a disk drive 100 with which the subject matter of the present disclosure may be used. In this particular example, disk drive 100 has three platters 101, 102, 103, although any number of platters may be included in a disk drive with which the present disclosure may be used. As shown, each platter 101, 102, 103 has, on each of its upper and lower surfaces 111, 112, a coating 110 made from a material in which data can be stored, e.g., magnetically. The present disclosure also is relevant to a disk drive in which one or more platters includes coating 110 on only one of its surfaces, but such a disk drive would store less data in the same volume than a disk drive with two-sided platters. The platters 101-103 are mounted on a rotatable spindle 104. Motor 105 rotates spindle 104 to rotate platters 101-103 in the direction of arrow A (FIG. 2). Although motor 105 is shown connected directly to spindle 104, in some cases motor 105 may be located off-axis of spindle 104 and would be connected to spindle 104 through belts or gears (not shown).

Read/write head assembly 120 includes an actuator 121 that bears arms 122-125, one of which is disposed adjacent to each surface 111, 112 of a platter 101, 102, 103 that has a memory storage coating 110. In this example, with heads on both surfaces of each of arms 123, 124, that amounts to four arms 122-125, but in the single-sided platter example discussed above, there would be only three arms. In other examples, the number of arms would increase or decrease along with the number of platters.

Each arm 122-125 bears, at or near its end furthest from actuator 121, and on both its upper and lower surfaces in the case of arms 123, 124, a plurality of read heads/sensors and write heads. In this case, two sensors 131, 132 are shown, and will be used to represent read sensors, although it would normally at least be expected that each set of one or more read sensors has a companion write head (not shown). It should be noted that FIGS. 1 and 2 are schematic only and not to scale. For example, the spindle diameter may be larger by comparison to the disk diameter.

A motor 126, commonly referred to as a "voice-coil motor," rotates actuator 121 back and forth along the directions of arrow B (FIG. 2) to move the heads 131, 132 along the path indicated by dashed arrow 201, although arms 122-125 normally cannot point directly at the center of the disk. The motion of actuator 121 thus changes both the radial and circumferential positions of heads 131, 132, but the circumferential positional change is relatively unimportant insofar as the platters are rotating. The motion of actuator 121 thus is used to control the radial position of heads 131, 132.

The location on surface 111 of platter 101 (the other surfaces are similar) of the aforementioned wedges is shown in FIG. 2. Each servo wedge 200 includes a sync mark followed by Gray-Code data identifying the wedge 200 by wedge, or sector, number (to give an angular, tangential or circumferential position) and by data representing, at each point along a radius of the platter, the distance from spindle 104, although sometimes some of this information is omitted from some of the wedges.

As noted above, there may be multiple read heads for each drive, or even for each platter. Each of those read heads may experience different, and potentially changing, channel conditions. For example, some read heads may pass ("fly") over the surface of the disk at a relatively low height ("fly-height"), while other read heads may fly over the surface of the disk at a relatively high fly-height. For read heads that are otherwise identical, a read head that flies higher will detect more data, but at lower resolution, than a read head that flies lower. Therefore, for best results, the processing of the output of each read head should be optimized according to the fly-height.

There may be other conditions than fly-height for which the read channel processing may benefit from optimization. For example, the underlying data being read may be subject to varying phase shifts. Therefore, it may be beneficial to optimize the processing of different read heads for different phase shifts.

Implementations of the subject matter of the present disclosure take advantage of the availability of multiple read head processing cores to optimize the processing of the outputs of each read head for different values of a condition to provide consistent performance across all of those values of the condition. In some implementations of the subject matter of the present disclosure, the processing of servo signals is adapted to account for more than one set of channel conditions.

Figure 3:
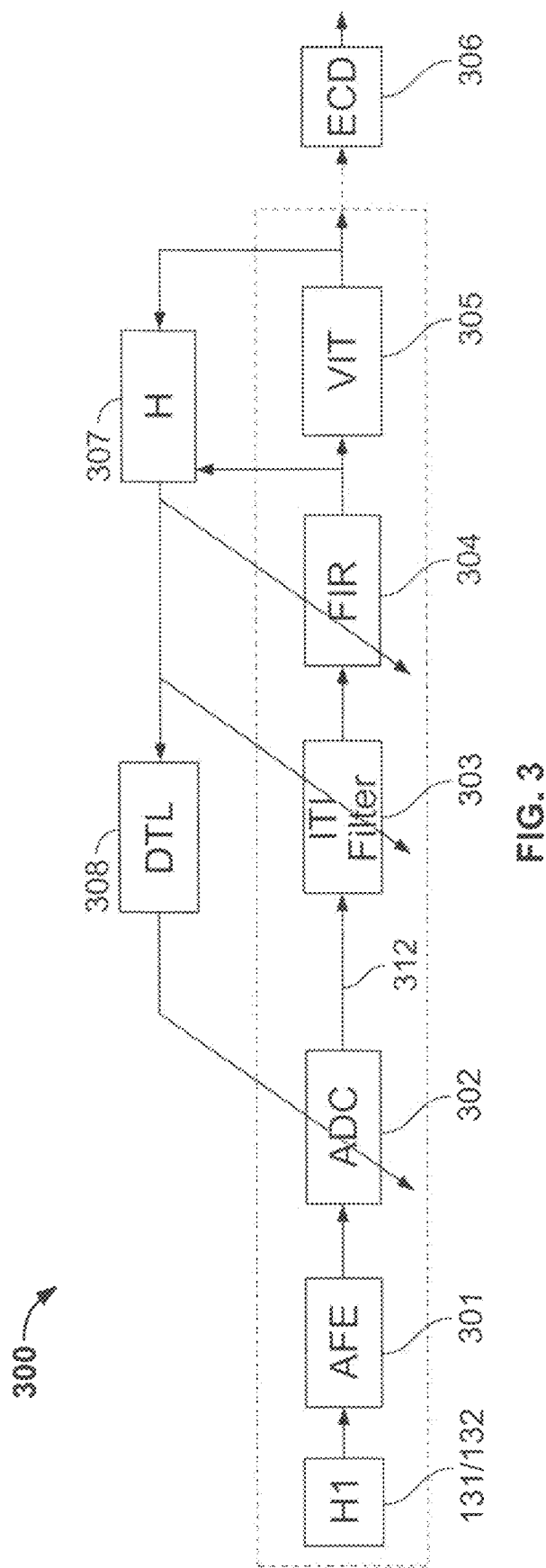
FIG. 3 is a schematic representation of a portion of a read channel.

A portion of a read channel 300 for processing the output of a single read head is shown in FIG. 3. Channel 300 has an analog front end (AFE) 301 and analog-to-digital converter (ADC) 302, providing digitized read head output signals 312 for further processing. While not relevant to the subject matter of this disclosure, an inter-track-interference (ITI) cancellation filter 303 may be provided to operate on signal 312 to remove interference from tracks that neighbor the track on which the head being processed is centered.

The output of ITI filter 303 is filtered, e.g. by a finite impulse response (FIR) filter 304, and then provided as an input to Viterbi detector (VIT) 305. Depending on the channel architecture, Viterbi detector decisions can be sent to an Error Correction Decoder Module (ECD) 306, or can be sent along with FIR samples to some other block, such as a data-dependent Viterbi detector or Soft-Output Viterbi Algorithm (SOVA) module if iterative error correction codes are used. Additionally, Viterbi decisions can be provided to channel reconstructive filter (H) 307. Reconstructed noiseless channel samples may then be used to drive digital timing loop (DTL) 308 to provide timing signals for analog-to-digital converter 302 and to adapt ITI and FIR filters 303, 304.

Figure 4:
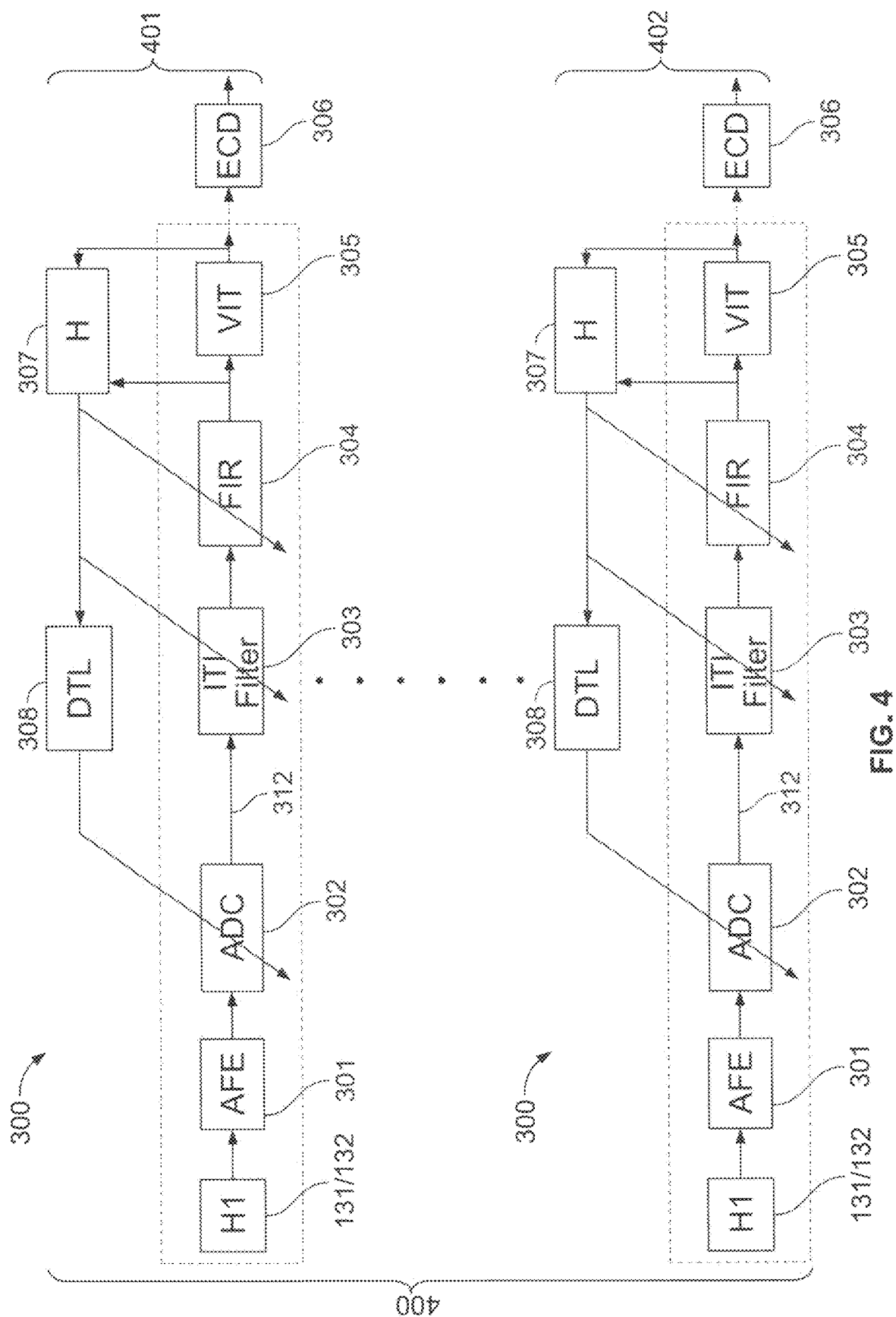
FIG. 4 shows a set of read channels as in FIG. 3.

More relevant for purposes of the present disclosure, the coefficients and parameters of FIR filter 304 and Viterbi detector 305 may be optimized for different possible values of the condition that is being measured for the read head being processed. As it is not known in advance the value of the condition that is being measured (e.g., fly-height), there may be a group 400 of different instances 401, 402, etc., of channel 300, as shown in FIG. 4, for different possible values of the condition. The output of the read head being measured is processed through each of the different instances 401, 402, etc., of channel 300, and the outputs of all of those instances 401, 402, etc., of channel 300 are compared, as discussed below, to select the "best" result. Whatever value of the condition being measured for which that "best" instance of channel 300 was optimized is taken to be the value of the condition for the read head being measured. The respective optimizations in each respective instance 401, 402, etc., of channel 300 are selected so that if there is more than one read head, the selected results for the outputs of multiple different read heads are consistent or normalized.

As discussed above, a typical disk drive includes multiple read heads. Each read head is processed in a group 400 of multiple parallel instances 401, 402, etc., of channels 300, each of which is optimized, as described above, for a different possible value of the condition that is being measured for the read head being processed. The number of groups 400 of parallel instances 401, 402, etc., of channels 300 in a given disk drive may be at least equal to the number of read heads in that disk drive, in which case all read heads are processed in parallel at multiple different optimizations. However, the number of groups 400 of parallel instances 401, 402, etc., of channels 300 in a given disk drive also may be less than the number of read heads in that disk drive. In such a case, all read heads could not be processed at all optimizations. One possible solution for such a situation would be to select a small enough subset of read heads at any given time, so that each individual read head in that subset can be processed within one group 400 of parallel instances 401, 402, etc., of channels 300). As a further variation of that solution, the read heads selected to be part of the subset could be varied over time so that all read heads contribute at least some of the time. Another possible solution would be to reduce the number of different optimizations at which each read head output is processed, so that the available number of instances 401, 402, etc., of channels 300 is sufficient to process all read heads all the time but at fewer different optimizations.

In the case where the condition being measured is fly-height, in particular, fly-height is indicated by coded bit density (CBD) of the read head output. For example, for a typical "low" fly-height, CBD=0.8, while for a typical "high" fly-height, CBD=1.7. The ITI and FIR filter parameters can be optimized for the different CBD values, depending on whether a head is to have a low fly-height or a high fly-height. For example, the channel parameters could be optimized by allowing adaptive filters to converge to minimize a cost function, such as minimum mean-squared error (MMSE). Alternatively, channel parameters could be optimized by sweeping the parameters and reading back channel performance statistics, such as bit error rate (BER), and selecting the parameters that maximize performance (e.g., minimize BER).

The choice of which head to use at a low fly-height, and which to use at a high fly-height may depend on whether the heads are similar or not. Heads are characterized by $T_{50}$—i.e., the width of the impulse response at one half the amplitude of the impulse response. A smaller $T_{50}$ represents a narrower, therefore sharper, peak for a "better" head. If the heads have similar $T_{50}$ values, then it may not matter which is used for high fly-height and which is used for low fly-height. But if the $T_{50}$ values are different, it may be advantageous to use the "better" head—with the smaller $T_{50}$ value—for the high fly-height, where better resolution may be needed.

Figure 5:
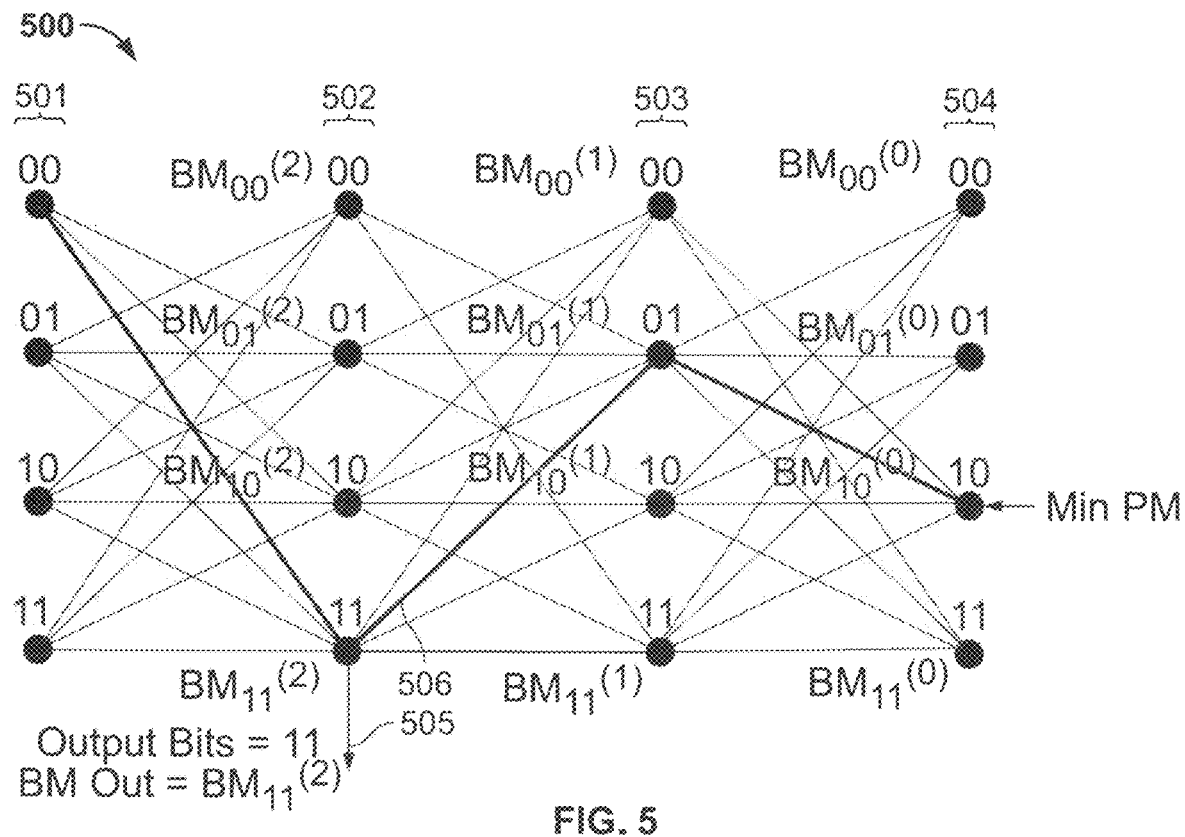
FIG. 5 shows the output trellis of a Viterbi detector.

The comparison of the different instances of channel 300 may be made on the basis of probabilities derived from branch metrics. As is known, the output of Viterbi detector 305 are branch metrics, representing distances from one state to the next along a "trellis" 500 as shown in FIG. 5. For each state 501, 502, 503, 504, the output branch metric 505 is the branch metric of the branch that is part of the path 506 whose path metric is the minimum of all possible path metrics of the trellis.

Figure 6:
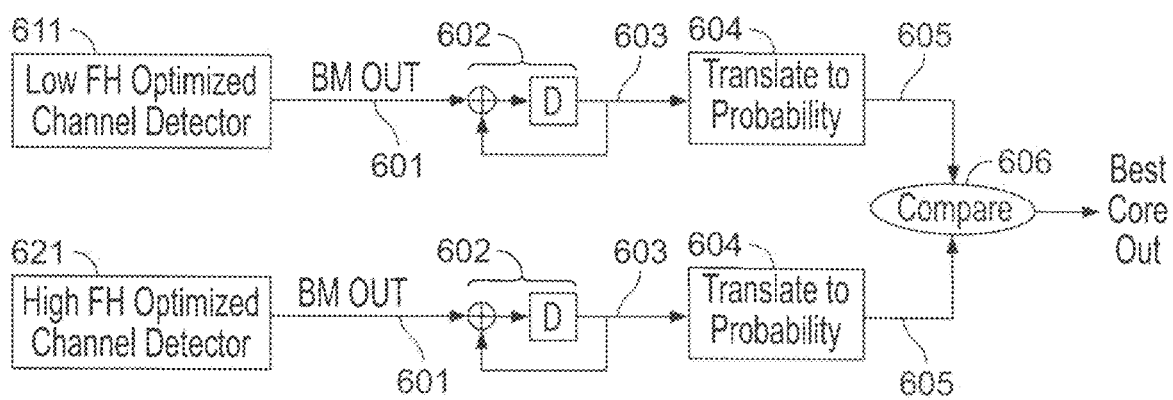
FIG. 6 is a diagram of a set of two channels for comparison.

In the implementation shown in FIG. 6, the branch metrics 601 output by each respective instance 611, 621 of channel 300 (each of which is optimized for a different value of the condition of interest) are accumulated at 602 and the accumulated branch metric values 603 are converted to probabilities 605 at 604, using a known logarithmic/exponential relationship. Probabilities 605 are compared at 606, and the instance of channel 300 with the higher probability is deemed the "best" channel. Alternatively (not shown), the accumulated branch metrics can be compared directly, without converting them to probabilities, in which case the instance of channel 300 with the lowest accumulated branch metric would be deemed the "best" channel.

As noted above, there may be more than two values of the channel condition. While fly-height most likely will have only two values (CBD representing high or low), other conditions such as phase shift may have multiple possible values. Therefore, there may be multiple, rather than only two, instances of the processing channel to be compared for each head.

Figure 7:
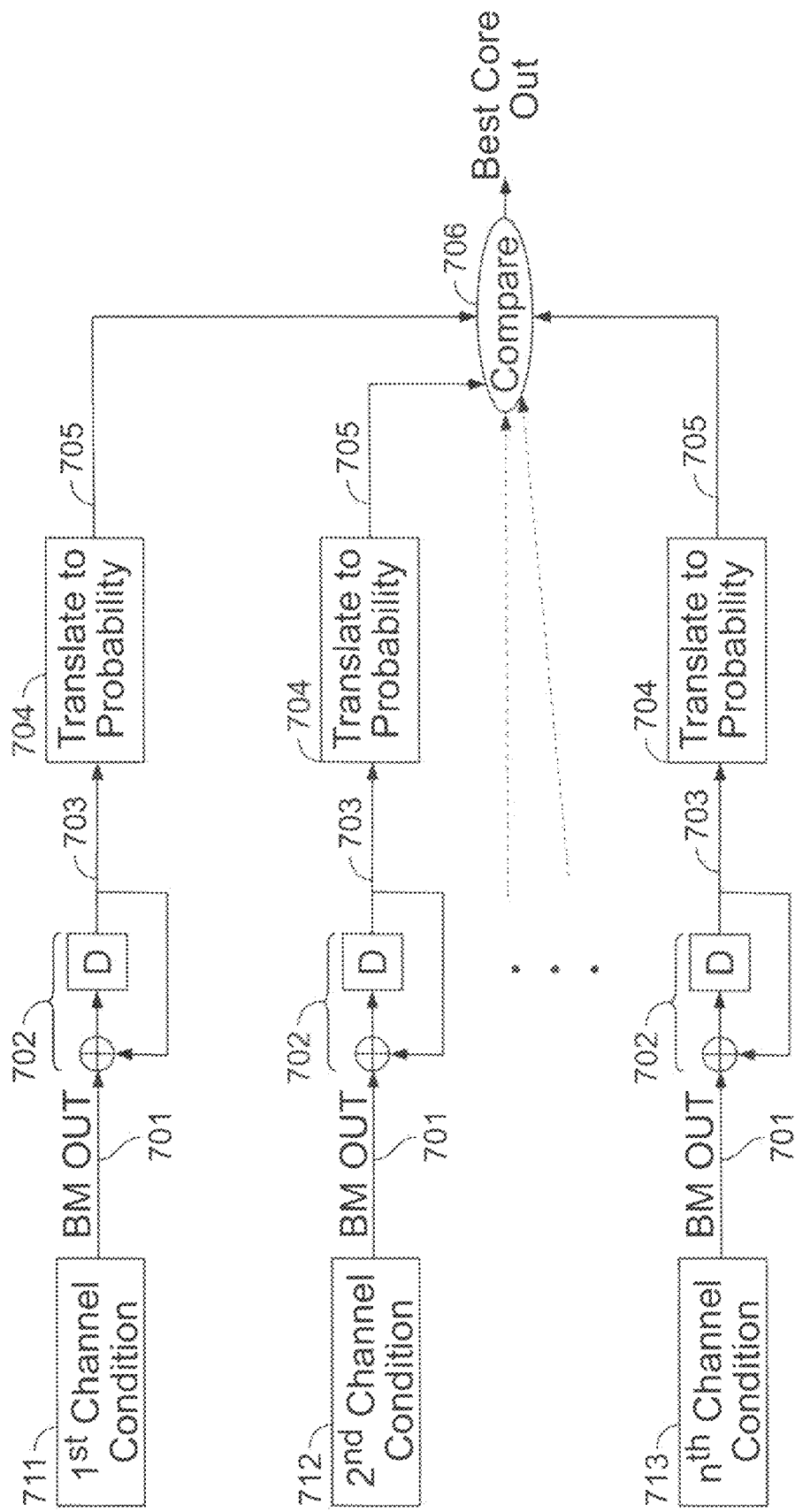
FIG. 7 is a diagram of a set of three or more channels for comparison.

In the implementation shown in FIG. 7, there are three or more instances 711, 712, 713 of channel 300. The branch metrics 701 output by each respective instance 711, 712, 713 of channel 300 (each of which is optimized for a different value of the condition of interest) are accumulated at 702 and the accumulated branch metric values 703 are converted to probabilities 705 at 704 as described above. Probabilities 705 are compared at 706, and the instance of channel 300 with the higher probability is deemed the "best" channel. Again, as an alternative (not shown), the accumulated branch metrics can be compared directly as described above.

Figure 9:
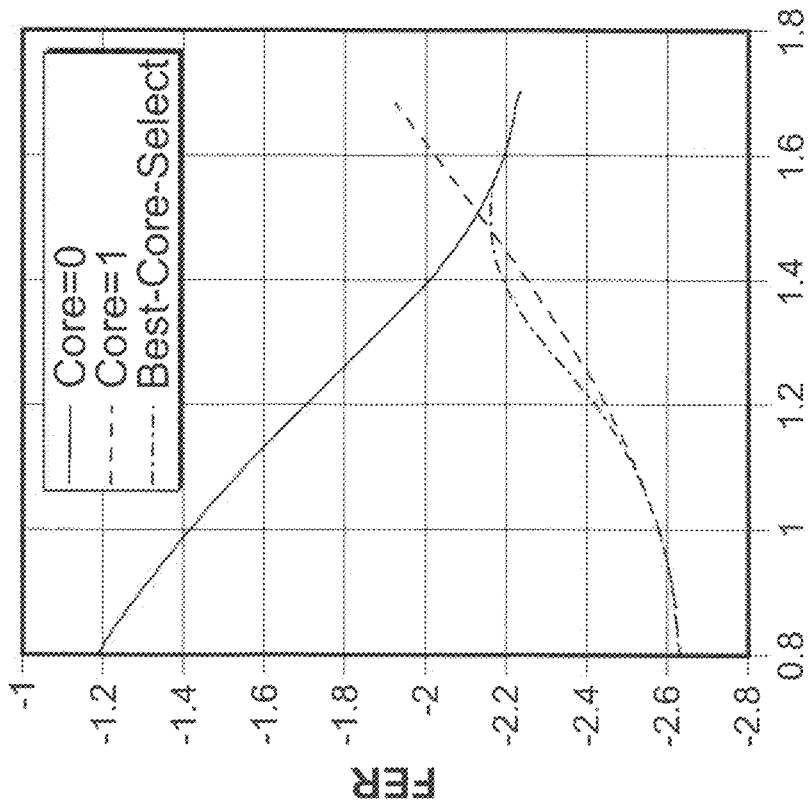
FIG. 9 is a graphic representation of frame error rate as a function of coded bit density in an implementation using a second servo modulation code.
Figure 8:
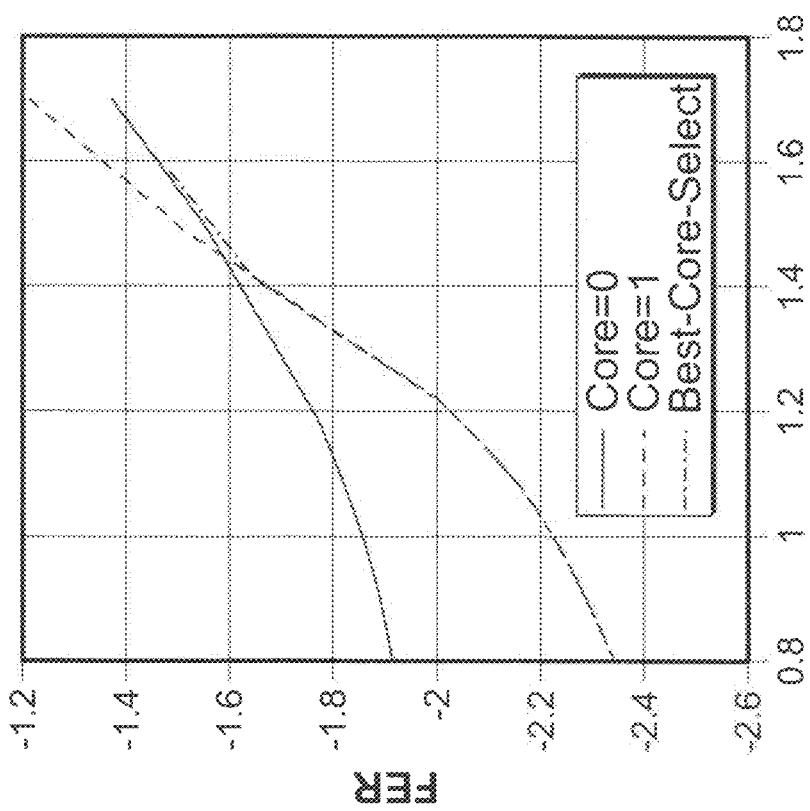
FIG. 8 is a graphic representation of frame error rate as a function of coded bit density in an implementation using a first servo modulation code.
Figure 10:
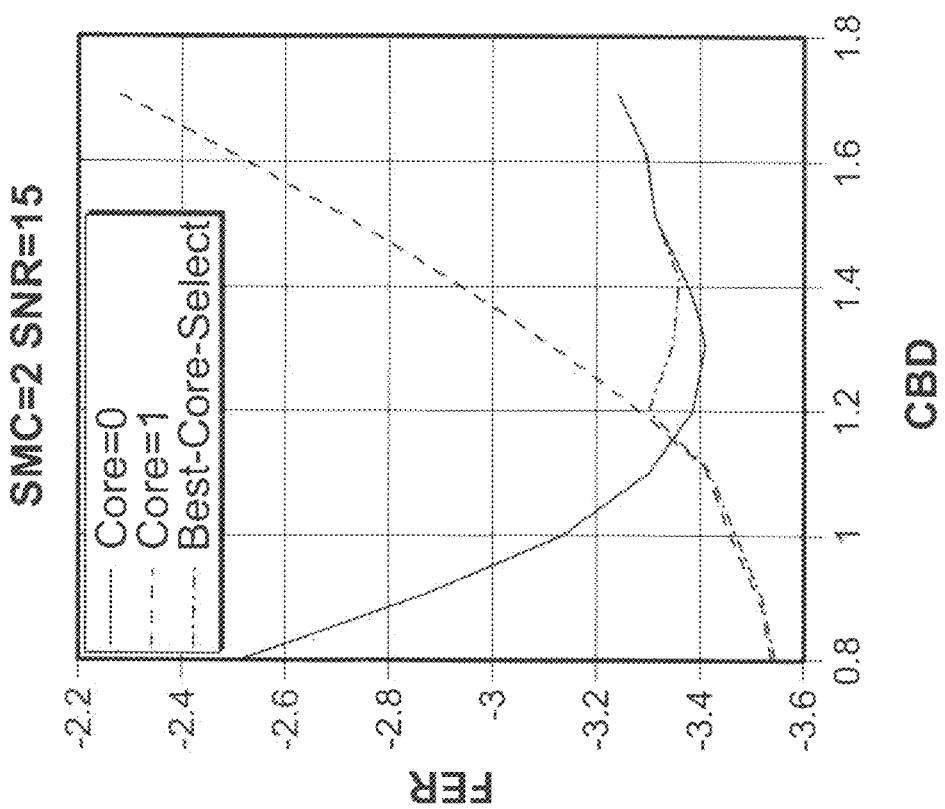
FIG. 10 is a graphic representation of frame error rate as a function of coded bit density in an implementation using a third servo modulation code.

Examples of the operation of an implementation of the subject matter of this disclosure (based on simulations) are shown in FIGS. 8, 9 and 10, which plot frame error rate (FER, as measured by frames in error per total number of frames read) logarithmically as a function of fly-height (as measured by CBD) for two different processing channels or "cores." Each of FIGS. 8, 9 and 10 represents the same system, with a signal-to-noise ratio of 15, using one of three different servo modulation codes (SMCs) identified as SMC=0, SMC=1 and SMC=2. In all cases, "Core 0" is optimized for CBD=1.7 (high fly-height) and Core 1 is optimized for CBD–0.8 (low fly-height). Although the specific responses differ according to the SMC that is in use, in all three cases, Core 0, which is optimized for high fly-height, has more errors at low fly-height than Core 1, which is optimized for low fly-height, while Core 1 has more errors at high fly-height than Core 0. Nevertheless, in these simulations, the best-core selection performed at 606/706 nearly perfectly tracks whichever of Core 0 and Core 1 has lower error.

Figure 11:
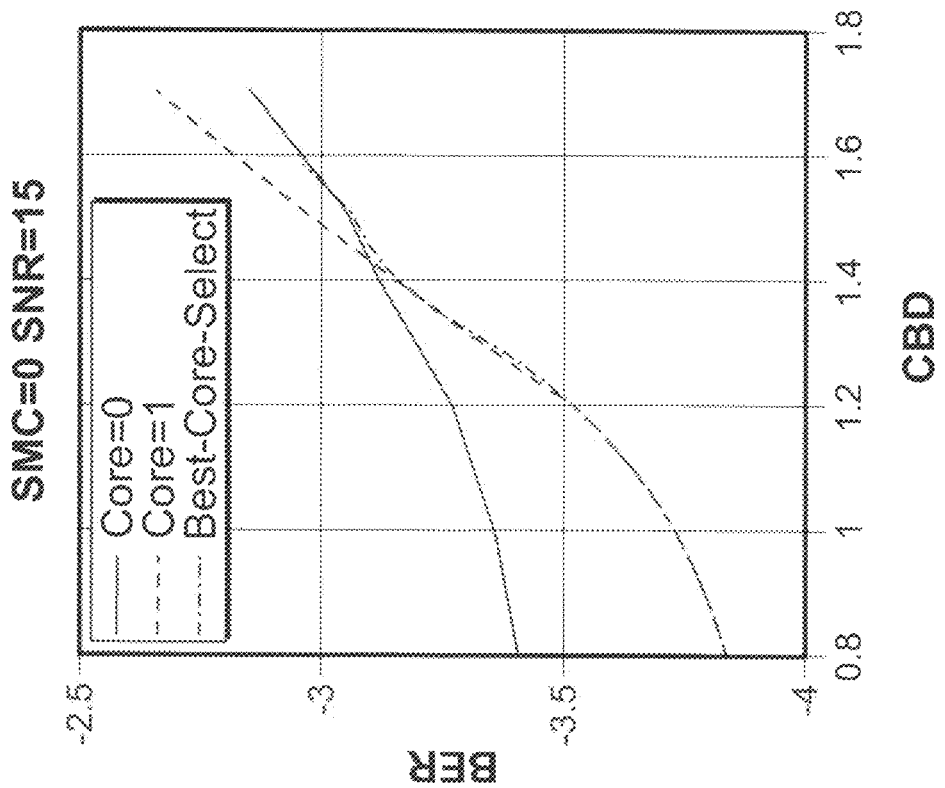
FIG. 11 is a graphic representation of bit error rate as a function of coded bit density in an implementation using a first servo modulation code.
Figure 13:
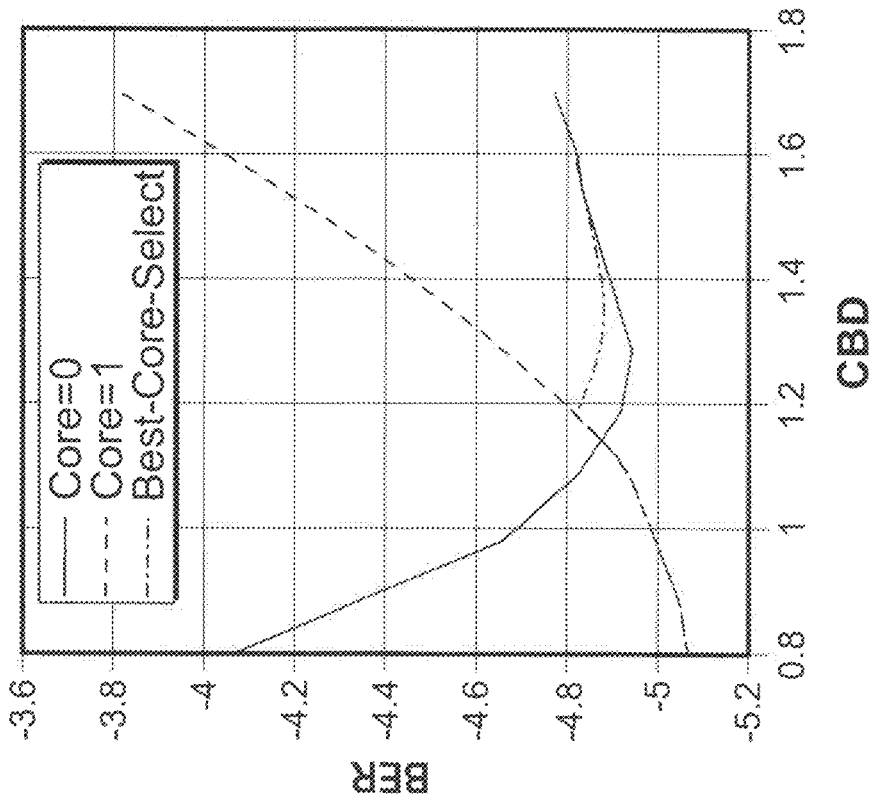
FIG. 13 is a graphic representation of bit error rate as a function of coded bit density in an implementation using a third servo modulation code.
Figure 12:
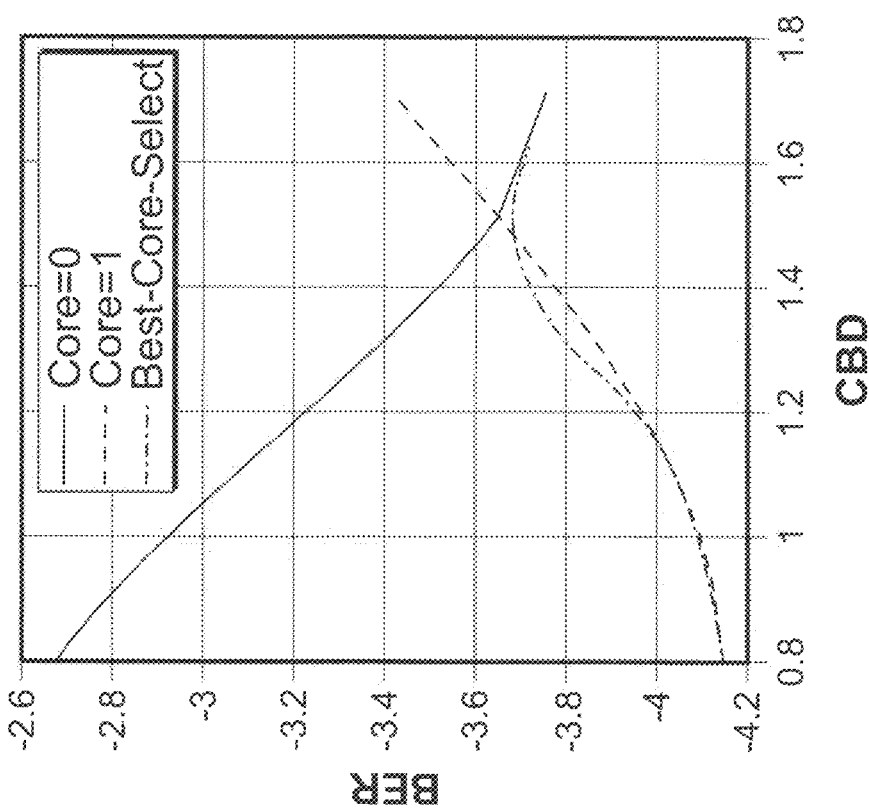
FIG. 12 is a graphic representation of bit error rate as a function of coded bit density in an implementation using a second servo modulation code.

The same results are achieved when bit error rate (BER, as measured by bits in error per total number of bits read) is measured rather than FER, as illustrated logarithmically in FIGS. 11, 12 and 13.

Figure 15:
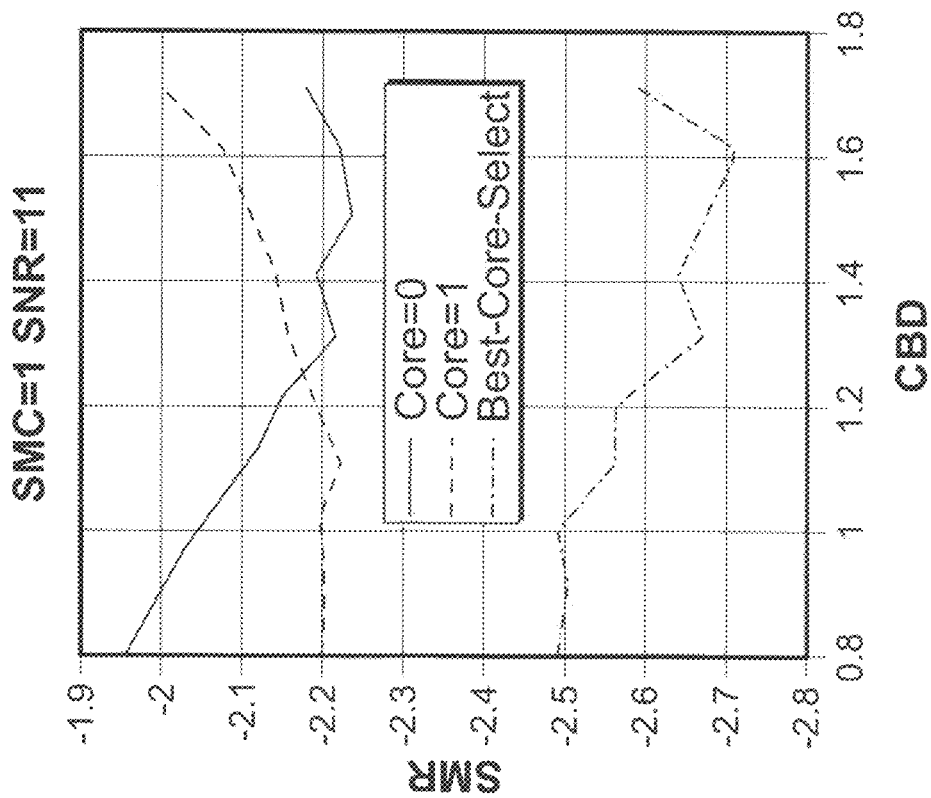
FIG. 15 is a graphic representation of sync-mark miss rate as a function of coded bit density in an implementation using a second servo modulation code.
Figure 14:
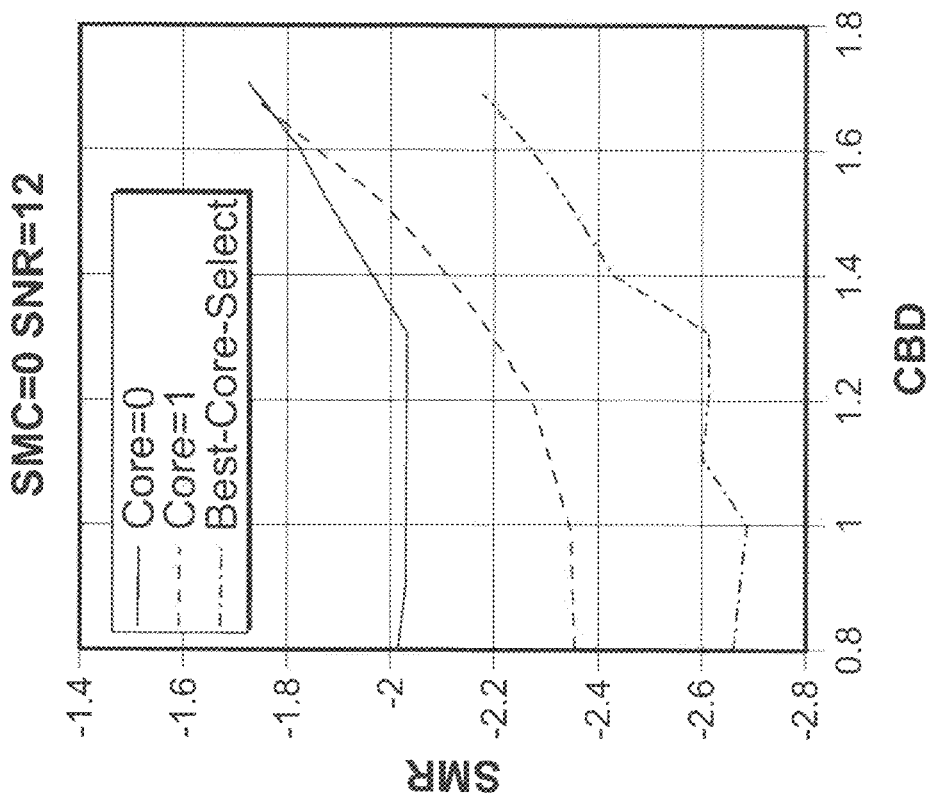
FIG. 14 is a graphic representation of sync-mark miss rate as a function of coded bit density in an implementation using a first servo modulation code.
Figure 16:
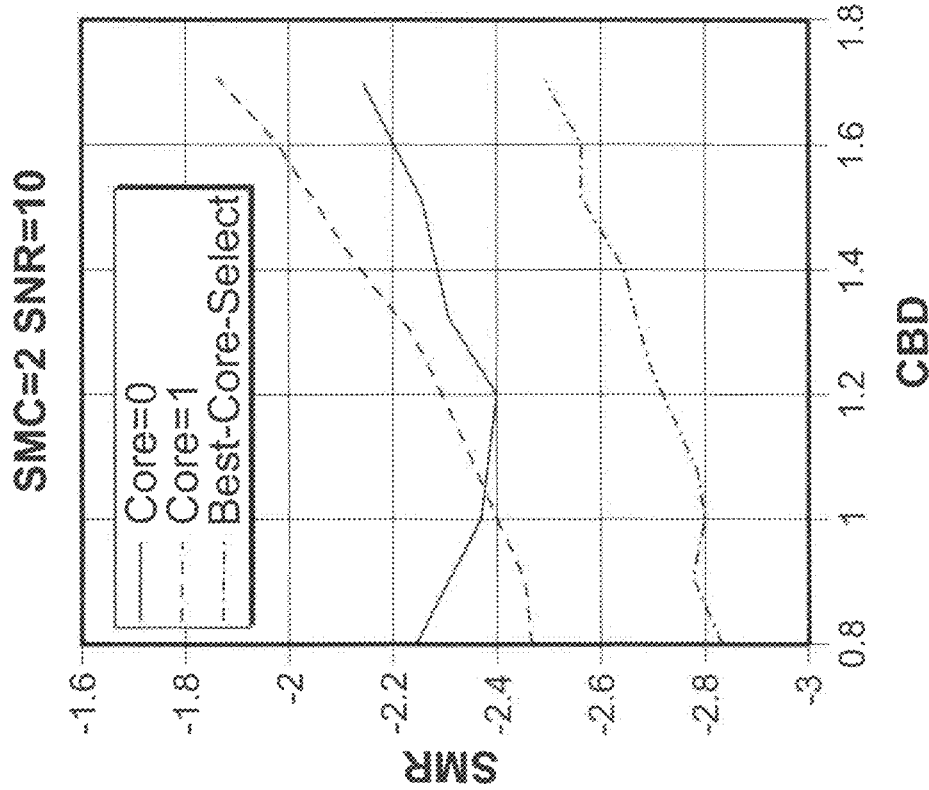
FIG. 16 is a graphic representation of sync-mark miss rate as a function of coded bit density in an implementation using a third servo modulation code.

Another measure of error is the sync-mark miss rate (SMR). Insofar as each core is optimized to different conditions, the probability that no core will find a sync mark (i.e., that the system will experience a "sync-mark miss") is small. Therefore, as seen in FIGS. 14, 15 and 16, each of which shows simulated measurements of SMR using a different SMC and, in these cases, different SNRs (to keep the values of SMR, which improve exponentially as a function of SNR, in approximately the same range), as a function of fly-height (as measured by CBD). While each core behaves as one would expect with respect to fly-height, the SMR for the selected best core of the system as a whole is substantially better than the SMR for either core individually, because of diversity gain (i.e., any core that finds the sync mark is trusted to provide the correct sync mark location, because the probability of misdetecting the sync mark is close to 0; therefore, the sync mark is declared found if at least one core finds the sync mark, and the overall chance of missing a sync mark is much smaller.

The simulations in FIGS. 8-16 all assumed that both heads are identical. However, as noted above, heads may be different, with each head having a different intrinsic CBD, separate from the contribution of fly-height to CBD, as measured, e.g., by $T_{50}$ as discussed above. The effective "final" CBD is the product of the intrinsic CBD and the CBD. When the intrinsic CBD of each head is different, it has been found through simulations, regardless of the SMC used, that the best head (lowest error rate) for low fly-height is the head with the higher intrinsic CBD, while the best head (lowest error rate) for high fly-height is the head with the lower intrinsic CBD.

The principles discussed above can be used in reverse to determine fly-height from the core selection results. Using either simulations or a series of calibration measurements for a particular system, the plots shown in FIG. 16, representing the selection rate of Core 0 (i.e., the fraction of the time that Core 0, which is the core optimized for high fly-height) as a function of CBD, can be determined. As expected, Core 0 is never selected for low fly-heights (CBD below about 1.2) and is always selected for high fly-heights (CBD above about 1.5). The system can be operated over a sufficient period of time (long enough for just one or a few servo wedges) to determine a consistent value of the selection rate for Core 0. The fly-height can be read from the graph in FIG. 17 (from the curve corresponding to the SMC in use), with the understanding that for a core selection rate of 0 or 1, respectively, only an estimated range of fly-heights (CBD below about 1.2 or above about 1.5, respectively) can be determined.

Figure 17:
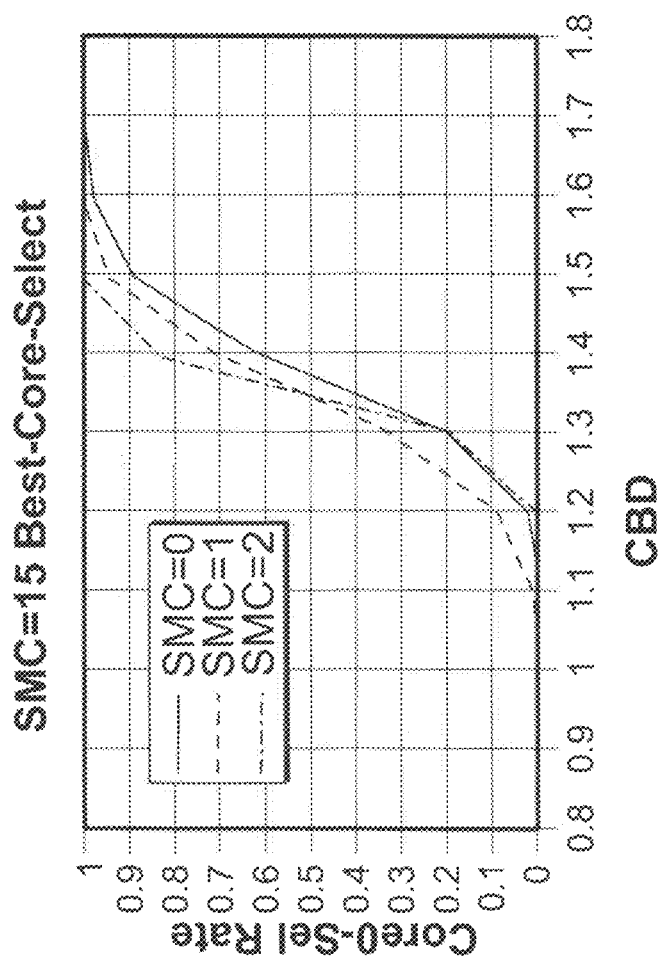
FIG. 17 is a graphic representation of processing core selection as a function of coded bit density in an implementation of the subject matter of this disclosure for determining fly-height.

Alternatively, instead of the graph in FIG. 17 based on the Core 0 selection rate, the Core 1 selection rate for each SMC could be graphed to determine fly-height. Under such an alternative, the graph in FIG. 17 would be inverted (not shown), with a core selection rate of 0 representing high fly-height and a core selection rate of 1 representing low fly-height.

Figure 18:
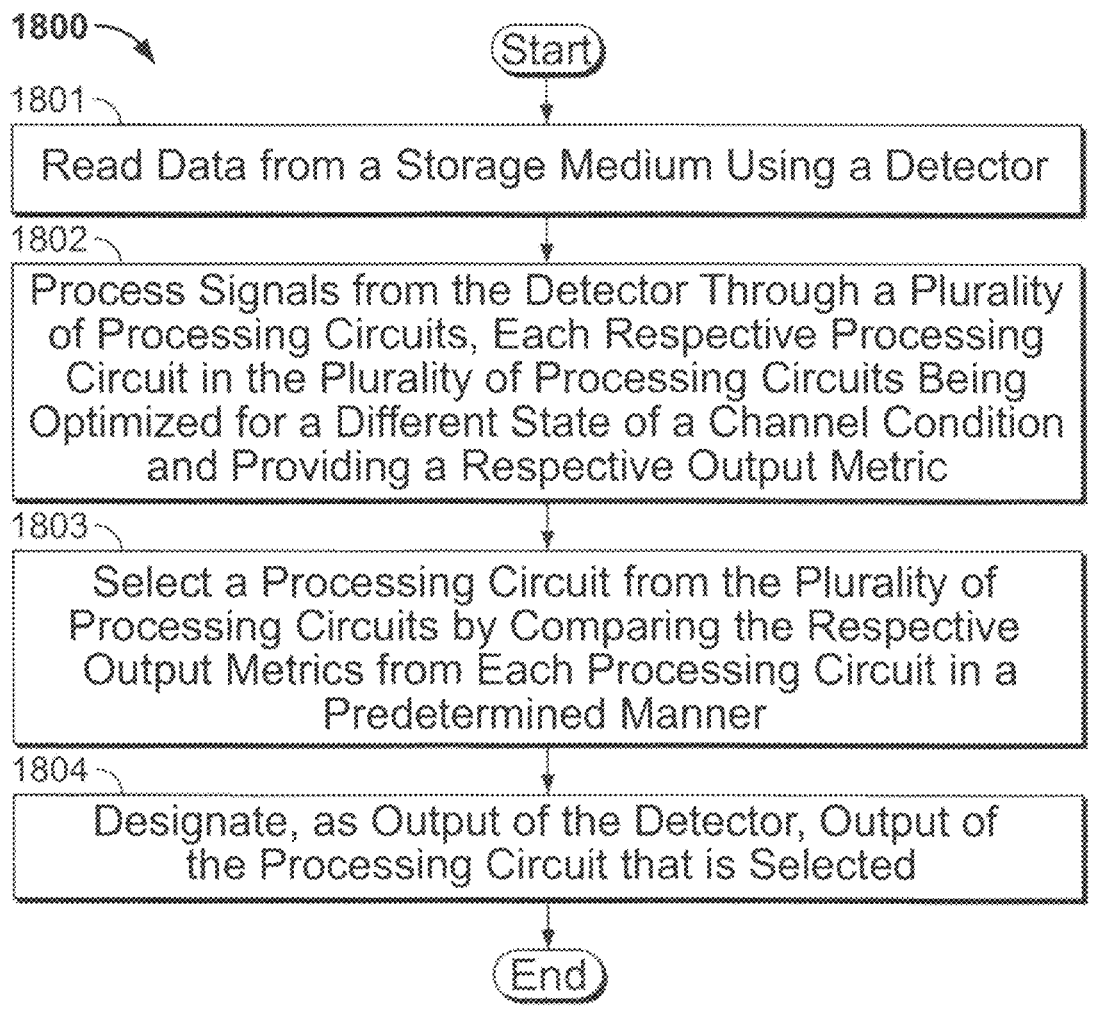
FIG. 18 is a flow diagram of a method according to an implementation of the subject matter of this disclosure for operating a storage device.

A method 1800 according to implementations of the subject matter of the present disclosure for operating a storage device is diagrammed in FIG. 18.

At 1801, data is read from a storage medium using a detector. At 1802, signals are processed from the detector through a plurality of processing circuits, each respective processing circuit in the plurality of processing circuits being optimized for a different state of a channel condition and providing a respective output metric. At 1803, a processing circuit is selected from the plurality of processing circuits by comparing the respective output metrics from each processing circuit in a predetermined manner. At 1804, the output of the processing circuit that is selected is designated as the output of the detector, and method 1800 ends.

Figure 19:
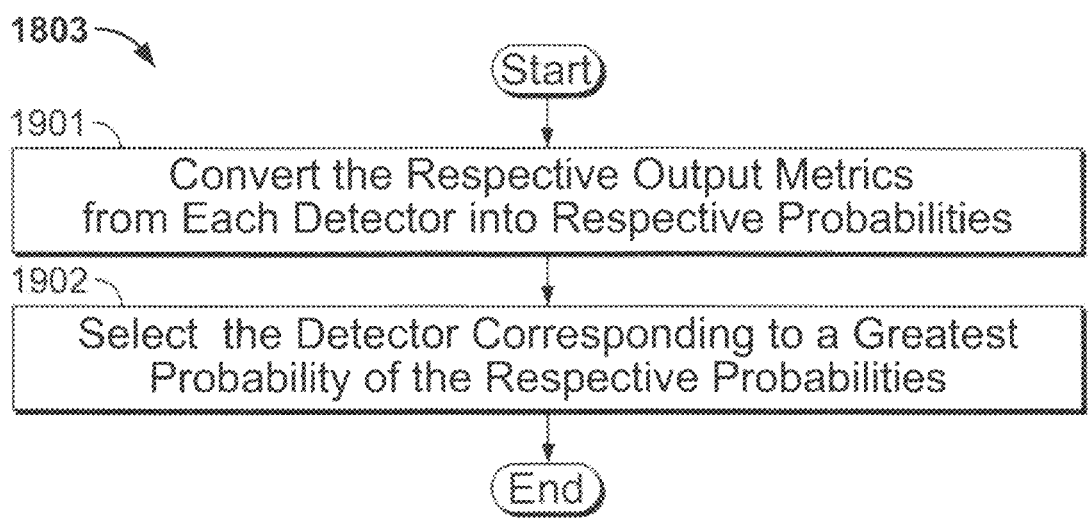
FIG. 19 is a flow diagram of one implementation of a portion of the method of FIG. 18.

FIG. 19 shows one implementation of the selecting at 1803. At 1901, the respective output metrics from each detector are converted into respective probabilities. At 1902, the detector corresponding to a greatest probability of the respective probabilities is selected, and selecting 1803 ends.

Thus it is seen that a disk drive, and method of operating a disk drive, in which the availability of multiple processing cores for read channel signals allows the optimization of channel conditions for each read head, have been provided.

As used herein and in the claims which follow, the construction "one of A and B" shall mean "A or B."

It will be understood that the foregoing is only illustrative of the principles of the invention, and that the invention can be practiced by other than the described embodiments, which are presented for purposes of illustration and not of limitation, and the present invention is limited only by the claims which follow.

What is claimed is:

1. A method of operating a storage device, the method comprising:
   reading data from a storage medium using a detector;
   processing signals from the detector through a plurality of processing circuits, each respective processing circuit in the plurality of processing circuits being optimized for a different state of a channel condition and providing a respective output metric;
   selecting only a single processing circuit from the plurality of processing circuits by comparing the respective output metrics from each processing circuit; and
   designating as output of the detector output of the processing circuit that is selected.

2. The method of claim 1 wherein the respective output metrics are branch metrics.

3. The method of claim 1 wherein the respective output metrics are path metrics.

4. The method of claim 1 wherein the channel condition is fly-height.

5. The method of claim 1 wherein the channel condition is phase shift.

6. The method of claim 1 wherein the selecting by comparing comprises:
   converting the respective output metrics from each detector into respective probabilities; and
   selecting the detector corresponding to a greatest probability of the respective probabilities.

7. The method of claim 6 further comprising summing the respective output metrics from each detector prior to the converting.

8. The method of claim 1 wherein:
   the reading comprises reading data from a storage medium using at least two detectors; the method further comprising:
   performing the processing, the selecting and the designating separately for each detector in the at least two detectors.

9. The method of claim 8 wherein the performing occurs seriatim for each detector in the at least two detectors.

10. The method of claim 8 wherein the performing occurs in parallel for each detector in the at least two detectors.

11. The method of claim 1 further comprising:
    maintaining statistics of results of the designating; and
    deriving the state of the channel condition from the statistics.

12. The method of claim 11 further comprising determining in advance a relationship between the results of the selecting and the state of the channel condition.

13. A storage device comprising:
    a storage medium; and
    a read channel including:
    at least one detector;
    a plurality of processing circuits that process signals from the at least one detector, each respective processing circuit in the plurality of processing circuits being optimized for a different state of a channel condition and providing a respective output metric; and
    a read channel controller that:
    selects only a single processing circuit from the plurality of processing circuits by comparing the respective output metrics from each processing circuit.

14. The storage device of claim 13 wherein each respective processing circuit provides as the respective output metric a branch metric.

15. The storage device of claim 13 wherein each respective processing circuit provides as the respective output metric a path metric.

16. The storage device of claim 13 wherein each respective processing circuit in the plurality of processing circuits is optimized for a respective fly-height.

17. The storage device of claim 13 wherein each respective processing circuit in the plurality of processing circuits is optimized for a respective phase shift.

18. The storage device of claim 13 wherein the read channel controller is configured to:
    convert the respective output metrics from each respective processing circuit into respective probabilities; and
    select the processing circuit corresponding to a greatest probability of the respective probabilities.

19. The storage device of claim 18 wherein the read channel controller is further configured to sum the respective output metrics from each respective processing circuit prior to converting the respective output metrics from each respective processing circuit into respective probabilities.

20. The storage device of claim 13 wherein the read channel controller is further configured to:
    maintain statistics of results of selecting the processing circuit; and
    derive the state of the channel condition from the statistics.

21. The storage device of claim 20 wherein the read channel controller stores a relationship between the results of selecting the processing circuit and the state of the channel condition.

22. The storage device of claim 13 wherein the at least one detector comprises at least two respective detectors.

23. The storage device of claim 22 wherein the read channel controller separately, for each respective one of the at least two respective detectors, selects a respective processing circuit from the plurality of processing circuits, by comparing the respective output metrics from each processing circuit in a predetermined manner.

24. The storage device of claim 23 wherein the read channel controller selects a respective processing circuit seriatim for each respective one of the at least two respective detectors.

25. The storage device of claim 23 wherein the read channel controller selects a respective processing circuit in parallel for each respective one of the at least two respective detectors.

26. The storage device of claim 22 wherein the respective detectors in the plurality of detectors have identical impulse responses.

27. The storage device of claim 22 wherein each respective detector in the plurality of detectors has a respective impulse response.

28. The storage device of claim 27 wherein each respective detector in the plurality of detectors is optimized for the respective different state of the channel condition.

* * * * *